Patented Jan. 9, 1945

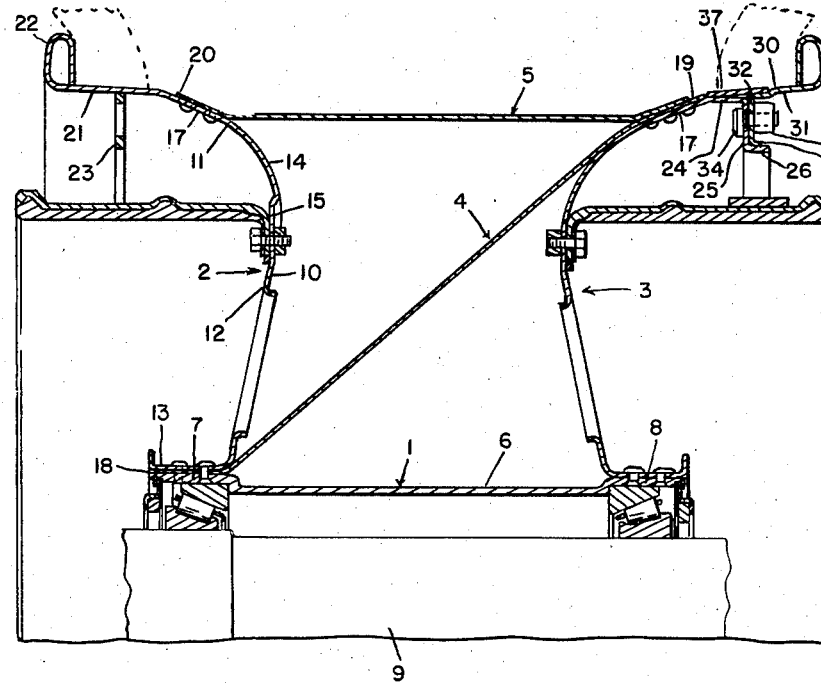
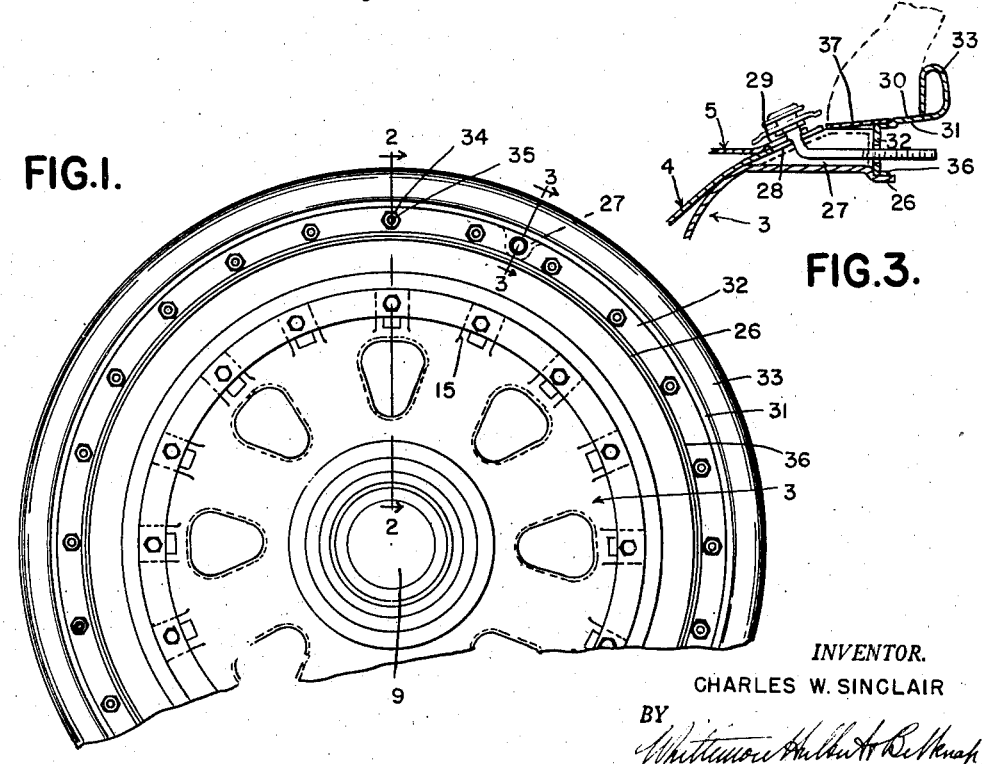

2,366,938

UNITED STATES PATENT OFFICE 2,366,938

WHEEL

Charles W. Sinclair, Detroit, Mich., assignor to Kelsey-Hayes Wheel Company, Detroit, Mich., a corporation of Delaware Application December 13, 1943, Serial No. 514,128

3 Claims. (Cl. 301—63)

The invention relates to wheels and refers more particularly to wheels of that type designed for use with pneumatic tires of relatively wide base and relatively small bead diameter.

The invention has for one of its objects to provide a wheel which is constructed to be relatively strong to withstand the stresses to which it is normally subjected and also to be relatively light in weight.

The invention has for another object to provide a wheel having a rim of relatively great width constructed in a manner to provide for ready mounting and demounting of a tire and also to reinforce the rim.

The invention has for a further object to provide a wheel constructed for attachment of a brake drum at each side of the wheel.

These and other objects of the invention will become apparent from the following description, taken in connection with the accompanying drawing, in which Figure 1 is a side elevation of a portion of a wheel embodying the invention;

Figures 2 and 3 are cross sections on the lines 2—2 and 3—3, respectively, of Figure 1.

The wheel is designed for use with pneumatic tires of relatively wide base and relatively small bead diameter. More particularly, the wheel is a relatively large airplane wheel subject to a very heavy load and also a very powerful brake thrust. The wheel comprises the hub 1, the inboard and outboard side elements 2 and 3, respectively, and the reinforcing element 4 and the annulus 5, both of which extend between and are secured to the side elements.

The hub 1 is formed of steel and preferably from a circular sheet steel blank by a series of drawing and upsetting and machining steps. The hub is tubular and has the reduced central portion 6 and the enlarged inboard and outboard end portions 7 and 8, respectively, at the ends of and integral with the central portion and adapted to receive suitable anti-friction bearings for mounting the wheel upon the axle 9.

Each of the inboard and outboard side elements 2 and 3 is a one-piece sheet steel disc preferably formed by die-pressing a flat circular steel blank. Each side element has a generally radially extending body portion 10 and a rim portion 11 integral with the body portion. Each body portion has a main part 12, a central axial part 13 and a peripherally flared part 14. The main parts of the body portions converge radially outwardly from the central axial parts which are secured to the end portions of the hub and the peripherally flared parts diverge radially outwardly from the main parts. The main parts are formed with the annular series of bosses 15 radially inwardly of the peripherally flared parts for attachment to rotatable brake drums at the inboard and outboard sides of the inboard and outboard side elements. The rim portions 11 diverge radially outwardly from the peripherally flared parts 14, each rim portion having a flared part 17 connecting into and extending outwardly from the associated peripherally flared part.

The reinforcing element 4 is made of sheet steel and is of generally conical section. It extends between and is connected to the central axial part 13 of the inboard side element 2 and the flared part 17 of the rim portion of the outboard side element 3. More particularly, the inboard end portion 18 of the reinforcing element extends axially and is located between the central axial parts 13 and the inboard end portion 7 of the hub 1 and is secured to both by the rivets used in securing the central axial part 13 to the inboard end portion 7. The outboard end portion 19 of the reinforcing element extends over and conforms to and is secured to the flared part 17 by suitable means, such as rivets.

The annulus 5 is made of sheet steel and is endless and has the flared inboard and outboard end portions 20 which are secured to the flared parts 17 of the inboard and outboard side elements preferably by rivets which include those for securing the outboard end portion 19 of the reinforcing element 4 to the outboard side element. The annulus forms the central well of a drop center tire carrying rim.

The rim portions of the inboard and outboard side elements are formed differently to provide for ready mounting and demounting of a pneumatic tire. More especially, the rim portion 11 of the inboard side element 2 is provided with the generally axially extending bead seat forming part 21 which extends in an inboard direction from the flared part 17 and with the return-bent hollow tire retaining bead 22 which extends generally radially outwardly from the bead seat forming part at its inboard edge. The bead seat forming part is preferably tapered so that it is inclined at approximately a 5 degree angle to the horizontal. 23 is a radially extending reinforcing steel ring between the bead seat forming part and the inboard brake drum and fixedly secured to the former as by being welded thereto. The rim portion 11 of the outboard side element 3 is formed with the axially extending part 24 which extends in an outboard direction from the flared part 17, with the annular reinforcing flange 25 which extends generally radially inwardly from the outboard edge of the axial part 24 and with the axial reinforcing flange 26 which extends in an outboard direction from the radially inner edge of the flange 25. To accommodate the valve stem, the parts 17 and 24 are radially inwardly depressed to form the axial channel 27. Also the outboard end portion 19 of the reinforcing element 4 and the flared end portion 20 of the annulus 5 are formed with the openings 28 and 29, respectively, for the passage of the valve stem into the channel.

For completing the rim and retaining the pneumatic tire in place, I have provided the tire retaining ring 30. It comprises the generally axial part 31, the annular flange 32 extending radially inwardly from the inboard edge of the part 31 and the return-bent hollow tire retaining bead 33 extending radially outwardly from the outboard edge of the generally axial part. The tire retaining ring is adapted to be detachably secured to the outboard side element by means of the bolts 34 and the nuts 35, the bolts extending through the flanges 25 and 32 and the heads of the bolts and nuts cooperating to clamp these flanges together. An axial flange 36 is preferably provided at the radially inner edge of the flange 32 for slidably engaging the axial flange 26 to relieve the bolts 34 from transverse shear. The flange 32 is formed with a suitable opening for the passage therethrough of the valve stem. 37 is an annular band preferably formed of relatively thin sheet steel secured to the generally axial part 31 and extending over the axial part 24, the band and the laterally outer portion of the generally axial part 31 forming a bead seat which is preferably tapered in the same manner as the bead seat 21.

With this construction, it will be seen that the ring 23, the tire retaining bead 22, the flanges 25 and 26 and the tire retaining ring 27 all serve to reinforce the tire carrying rim and that they and the reinforcing element 4 serve to reinforce the wheel enabling it to be combined with brakes at its opposite sides and to withstand the very large radial, end thrust and torque loads to which it is subject.

What I claim as my invention is:

1. A wheel comprising axially spaced sheet metal side elements each formed of a body portion and an integral rim portion, a sheet metal reinforcing element of generally conical section having a portion secured to the body portion of one of said side elements and a second portion secured to the rim portion of the other of said side elements, a sheet metal annulus having a portion secured to said rim portion of said first mentioned side element and another portion secured to said second portion of said reinforcing element, a reinforcing ring secured to and extending generally radially inwardly from the rim portion of said first mentioned side element, said rim portion of said second mentioned side element having an annular reinforcing flange extending generally radially inwardly from said rim portion, and a tire retaining ring secured to said reinforcing flange.

2. A wheel comprising sheet metal side elements each formed of a body portion and an integral rim portion having a flared part connecting directly into said body portion, a sheet metal annulus having portions extending over and secured to the flared parts of said rim portions, one of said rim portions having a generally radially inwardly extending reinforcing flange, a tire retaining ring having a generally axial portion, a generally radially inwardly extending flange at one edge of said axial portion, and a generally radially outwardly extending bead at the other edge of said axial portion, and means for detachably securing said generally radially inwardly extending flange of said ring to said reinforcing flange of said rim portion.

3. A wheel comprising a sheet metal side element formed of a body portion and an integral rim portion having a flared part connecting directly into said body portion, a generally axial part extending from said flared part and a generally radial tire retaining bead extending outwardly from said generally axial part, a second sheet metal side element formed of a body portion and an integral rim portion having a flared part connecting directly into said last mentioned body portion, a generally axial part extending from said last mentioned flared part and a generally radial reinforcing flange extending inwardly from said last mentioned generally axial part, a sheet metal reinforcing element of generally conical section having a portion secured to said first mentioned body portion and a portion extending over and secured to said last mentioned flared part, a sheet metal annulus having flared end portions extending over and secured to said first mentioned flared part and said second mentioned portion of said reinforcing element, a tire retaining ring having a generally radial part detachably secured to said generally radial reinforcing flange and a generally radial tire retaining bead, and a reinforcing ring secured to and extending generally radially inward from said first mentioned generally axial part.

CHARLES W. SINCLAIR.